US007359522B2

(12) United States Patent
Aarts et al.

(10) Patent No.: US 7,359,522 B2
(45) Date of Patent: Apr. 15, 2008

(54) CODING OF STEREO SIGNALS

(75) Inventors: Ronaldus Maria Aarts, Eindhoven (NL); Roy Irwan, Groningen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 505 days.

(21) Appl. No.: 10/510,261

(22) PCT Filed: Mar. 20, 2003

(86) PCT No.: PCT/IB03/01154

§ 371 (c)(1), (2), (4) Date: Oct. 5, 2004

(87) PCT Pub. No.: WO03/085645

PCT Pub. Date: Oct. 16, 2003

(65) Prior Publication Data

US 2005/0213522 A1 Sep. 29, 2005

(30) Foreign Application Priority Data

Apr. 10, 2002 (EP) .................................. 02076408

(51) Int. Cl.
*H04B 15/00* (2006.01)

(52) U.S. Cl. ....................... 381/94.7; 341/51; 341/141; 341/143; 381/16; 381/94.1

(58) Field of Classification Search ................ 381/94.7
See application file for complete search history.

(56) References Cited

U.S. PATENT DOCUMENTS 4,554,670 A * 11/1985 Aiko et al. ................. 375/249
5,434,948 A * 7/1995 Holt et al. .................. 704/220
5,473,702 A * 12/1995 Yoshida et al. ............ 381/94.7
5,511,093 A 4/1996 Edler et al.
5,740,256 A * 4/1998 Castello Da Costa et al. ......................... 381/94.7
5,754,665 A * 5/1998 Hosoi ........................ 381/94.1
6,121,904 A 9/2000 Levine ........................ 341/65
6,285,301 B1 * 9/2001 Bruekers et al. .............. 341/51
6,430,295 B1 * 8/2002 Handel et al. ............. 381/94.7
6,496,584 B2 * 12/2002 Irwan et al. .................. 381/18
6,738,482 B1 * 5/2004 Jaber ......................... 381/94.7
6,882,731 B2 * 4/2005 Irwan et al. .................. 381/18
6,963,649 B2 * 11/2005 Vaudrey et al. ............ 381/94.7

FOREIGN PATENT DOCUMENTS

WO WO02/052896 A2 7/2002

* cited by examiner

*Primary Examiner*—Khai M. Nguyen

(57) ABSTRACT

A method of encoding a multi-channel signal having first and second signal components includes determining a set of filter parameters a prediction filter such that the prediction filter provides an estimate of the second signal component when receiving the first signal component as an input. The multi-channel signal is represented as the first signal component and the set of filter parameters. A corresponding decoding method and arrangements for encoding and decoding multi-channel signals are also provided.

15 Claims, 5 Drawing Sheets

CODING OF STEREO SIGNALS

This invention relates to the coding of multichannel signals including at least a first and a second signal component. More particularly, the invention relates to the coding of multiphonic audio signals, such as stereophonic signals.

Stereophonic audio signals comprise a left (L) and a right (R) signal component which may originate from a stereo signal source, for example from separated microphones. The coding of audio signals aims at reducing the bit rate of a stereophonic signal, e.g. in order to allow an efficient transmission of sound signals via a communications network, such as the Internet, via a modem and analogue telephone lines, mobile communication channels or other a wireless networks, etc., and to store a stereophonic sound signal on a chip card or another storage medium with limited storage capacity.

U.S. Pat. No. 6,121,904 discloses a compressor for compressing digital audio signals comprising corresponding predictors for the left and right stereo channels. The predictor for the left channel receives a current sample and previous samples of the left audio signal as well as the current and previous samples of the right audio signal and produces a predicted next sample of the left signal. Similarly, the predictor for the right channel receives a current sample and previous samples of the right audio signal as well as the current and previous samples of the left audio signal and produces a predicted next sample of the right signal.

It is an object of the present invention to provide a method of and an arrangement for coding multichannel signals with a low bit rate.

The above and other objects are achieved by a method of encoding a multichannel signal including at least a first signal component and a second signal component, the method comprising the steps of

- determining a set of filter parameters of a prediction filter such that the prediction filter provides an estimate of the second signal component when receiving the first signal component as an input; and
- representing the multichannel signal as the first signal component and the set of filter parameters.

Consequently, by encoding the multichannel signal as a first signal component and a set of filter parameters, the multichannel signal is encoded with a bit rate which is only slightly higher than that of a single channel, e.g. a mono channel. The resulting encoded signal may be stored and/or communicated to a receiver. The invention is based on the recognition that for many multichannel signals one signal component may be predicted from at least one other channel of the multichannel signal by an adaptive filter process. Consequently, when the determined filter parameters are communicated to a decoder, the multichannel signal may be retrieved on the basis of the first signal component and the filter parameters, allowing the decoder to model the second signal component.

The term multichannel signal comprises any signal including two or more interrelated signal components. Examples of such signals include multiphonic audio signals, such as stereophonic signals, or the like, comprising synchronised recordings of the same audio presentation. According to some embodiments of the invention the multichannel signal comprises transformed signal components of a multichannel source signal, e.g. transformed stereophonic signal components generated by transforming the L and R stereo signals into a transformed set of signals which may be better suited for the modelling of one signal component by another according to the invention. Further examples of multi-channel signals include signals received from a Digital Versatile Disc (DVD) or a Super Audio Compact Disc, etc.

In a preferred embodiment of the invention, the step of determining the set of filter parameters comprises the step of determining the filter parameters such that a difference of the second signal component and the estimated signal component is smaller than a predetermined value. When the difference between the modelled signal and the second signal component is small, the modelled signal provides a good estimate of the second signal component. Hence, a measure of quality is provided for the modelling of the second signal component, thereby ensuring that the coding process according to the invention provides a minimum reduction in quality, e.g. in the example of stereo audio signals minimum audible distortions of the signal.

According to a further preferred embodiment of the invention, the step of representing the multichannel signal as the first signal component and the set of filter parameters further comprises the step of representing the multichannel signal as the first signal component, the set of filter parameters, and an error signal indicative of the difference of the second signal component and the estimated signal component, if said difference is not smaller than said predetermined value.

Hence, if the estimated signal provided by the step of filtering does not model the second signal component sufficiently well, the error signal is included in the encoded signal, thereby providing the decoder with additional information. The decoder may combine the predicted signal with the received error signal, thereby achieving a good approximation of the second signal component. The bit rate used for communicating the error signal may be varied, e.g. according to the bandwidth available for a communication link at a given time. Hence, it is an advantage of the invention that it provides the possibility for a trade-off between the bit rate used for communicating the signal and the signal quality at the receiver. Therefore, a mechanism for graceful degradation is provided, e.g. by adaptively increasing or decreasing the bit rate allowed for the error signal.

In another preferred embodiment of the invention, the method further comprises the step of transforming at least a first source signal component and a second source signal component of a multichannel source signal into the first and second signal components. Consequently the first and second signal components are respective combinations of the first and second source signal components, thereby providing an input signal to the prediction filter which may be better suited for predicting the second signal component as the corresponding source signals. Examples of transformations include linear combinations of the first and second source signals, for example, in the case of stereophonic audio signals the combinations L+R and L−R. Further examples include rotations in signal space and other transformations. The transformation may be parameterised by transformation parameters which may be fixed or adaptive. i.e. they may be adapted according to properties of the source signal.

In a further preferred embodiment of the invention,

- said first signal component is a principal component signal of a source multichannel signal including a number of source signal components and the second signal component is a corresponding residual signal;
- the method further comprises the step of transforming at least the first and second source signal components by a predetermined transformation into the principal component signal including most of the signal energy and at least the residual signal including less energy than the principal component signal, the predetermined transformation being parameterised by at least one transformation parameter; and the step of representing the multichannel signal as the first signal component and the set of filter parameters further comprises the step of representing the multichannel signal as the principal component signal, the set of filter parameters, and the transformation parameter.

Hence, according to this embodiment, the multichannel signal is represented by the principal signal, the transformation parameter, and the set of filter parameters allowing the receiver to model the small residual signal, thereby improving the coding efficiency for the multichannel signal. This embodiment is based on the recognition that for many multichannel signals, e.g. in the case of audio signals for music and speech signals, the residual signal may accurately be estimated as a filtered version of the principal signal. It is therefore an advantage of this embodiment that it provides a particularly efficient method of encoding which preserves a high level of quality.

Preferably, the optimal transformation parameter may continuously be tracked, thereby ensuring the transformation remains optimal even if the characteristics of the input signal changes, e.g. in the example of an audio signal due to a moving sound source or changes in acoustic properties of the environment.

When the predetermined transformation is a rotation and the transformation parameter corresponds to an angle of rotation, a simple transformation is provided based only on a single parameter, the angle of rotation. By adapting the angle such that the signal components, e.g. the L and R signal components of a stereo signal, are rotated into a principal component signal and a residual signal, an efficient coding is provided while maintaining a high quality signal.

It is an advantage of the invention that it provides an efficient bit-rate utilisation, i.e. a coding scheme which uses a low bit rate for a given sound quality. The coding scheme according to the invention may be used to reduce the bit rate without significantly reducing the sound quality, to maintain the bit rate while improving the sound quality, or a combination of the above.

In a preferred embodiment of the invention, the step of determining a set of filter parameters further comprises the step of determining at least one scaling parameter ($\beta_1,\beta_2$) for scaling the estimate of the second signal component such that a measure of correlation between the second signal component and the estimate of the second signal component is increased. Consequently, a measure of similarity between the estimated and the actual signal is optimised, thereby further improving the quality of the coded signal.

The invention further relates to a method of decoding multichannel signal information, the method comprising the steps of receiving a first signal component and a set of filter parameters;

estimating a second signal component using a prediction filter corresponding to the received set of filter parameters, the prediction filter receiving the received first signal component as an input.

The present invention can be implemented in different ways including the methods described above and in the following, arrangements for encoding and decoding multichannel signals, respectively, a data signal, and further product means, each yielding one or more of the benefits and advantages described in connection with the first-mentioned method, and each having one or more preferred embodiments corresponding to the preferred embodiments described in connection with the first-mentioned method and disclosed in the dependant claims.

It is noted that the features of the methods described above and in the following may be implemented in software and carried out in a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

The invention further relates to an arrangement for encoding a multichannel signal including at least a first signal component and a second signal component the arrangement comprising a prediction filter for estimating the second signal component, the prediction filter corresponding to a set of filter parameters and receiving the first signal component as an input; and processing means for representing the multichannel signal as the first signal component and the set of filter parameters.

The invention further relates to an arrangement for decoding a multichannel signal corresponding to at least two signal components, the arrangement comprising receiving means for receiving a first signal component of the multichannel signal and a set of filter parameters;

a prediction filter for estimating a second signal component of the multichannel signal, the prediction filter receiving the received set of filter parameters and the received first signal component as an input.

The above arrangements may be part of any electronic equipment including computers, such as stationary and portable PCs, stationary and portable radio communications equipment and other handheld or portable devices, such as mobile telephones, pagers, audio players, multimedia players, communicators, i.e. electronic organisers, smart phones, personal digital assistants (PDAs), handheld computers, or the like.

The term processing means comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof. The above first and second processing means may be separate processing means or they may be comprised in one processing means.

The term receiving means includes circuitry and/or devices suitable for enabling the communication of data, e.g. via a wired or a wireless data link. Examples of such receiving means include a network interface, a network card, a radio receiver, a receiver for other suitable electromagnetic signals, such as infrared light, e.g. via an IrDa port, radio-based communications, e.g. via Bluetooth transceivers, or the like. Further examples of such receiving means include a cable modem, a telephone modem, an Integrated Services Digital Network (ISDN) adapter, a Digital Subscriber Line (DSL) adapter, a satellite transceiver, an Ethernet adapter, or the like.

The term receiving means further comprises other input circuits/devices for receiving data signals, e.g. data signals stored on a computer-readable medium. Examples of such receiving means include a floppy-disk drive, a CD-Rom drive, a DVD drive, or any other suitable disc drive, a memory card adapter, a smart card adapter, etc.

The invention further relates to a data signal including multichannel signal information, the data signal being generated by a method described above and in the following. The signal may be embodied as a data signal on a carrier wave, e.g. as a data signal transmitted by communications means as described above and in the following.

The invention further relates to a computer-readable medium comprising a data record indicative of multichannel signal information generated by a method described above and in the following. The term computer-readable medium comprises magnetic tape, optical disc, digital video disk (DVD), compact disc (CD or CD-ROM), mini-disc, hard disk, floppy disk, ferro-electric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

The invention further relates to a device for communicating a multichannel signal, the device comprising an arrangement for encoding the multichannel signal as described above and in the following.

These and other aspects of the invention will be apparent from and elucidated with reference to the embodiments and with reference to the drawing, in which.

Figure 7A:
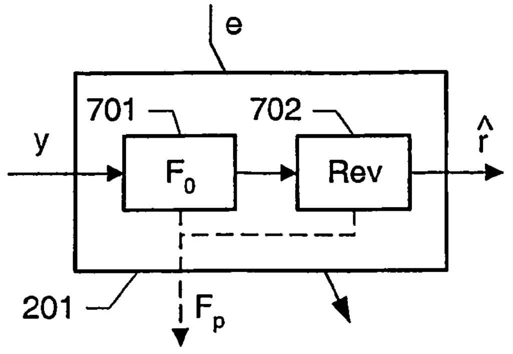
Figure 7B:
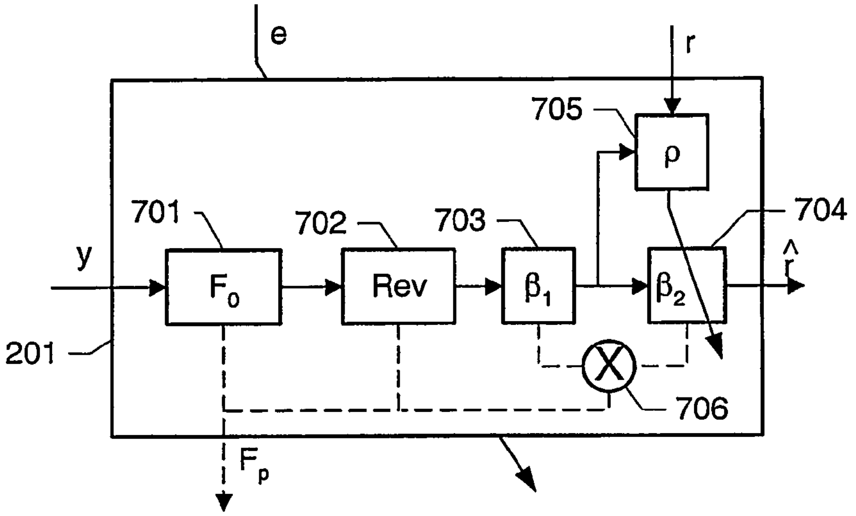
Figure 7C:
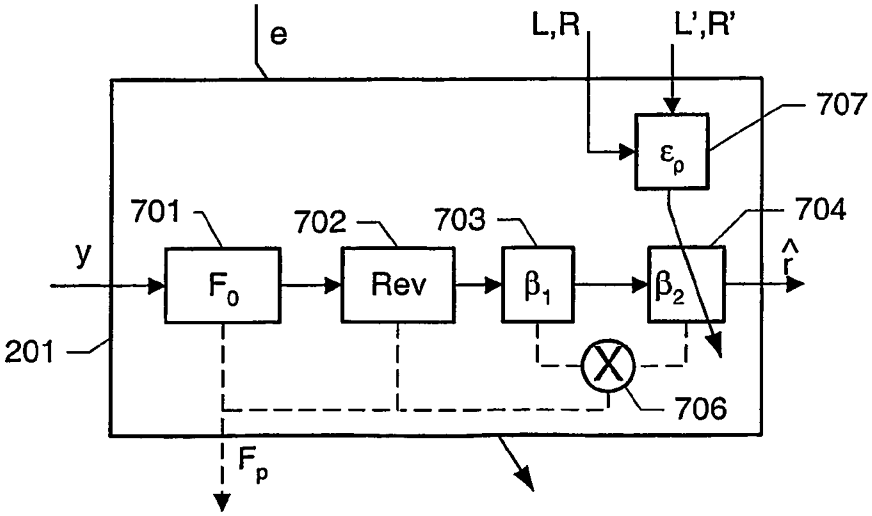
Figure 8:
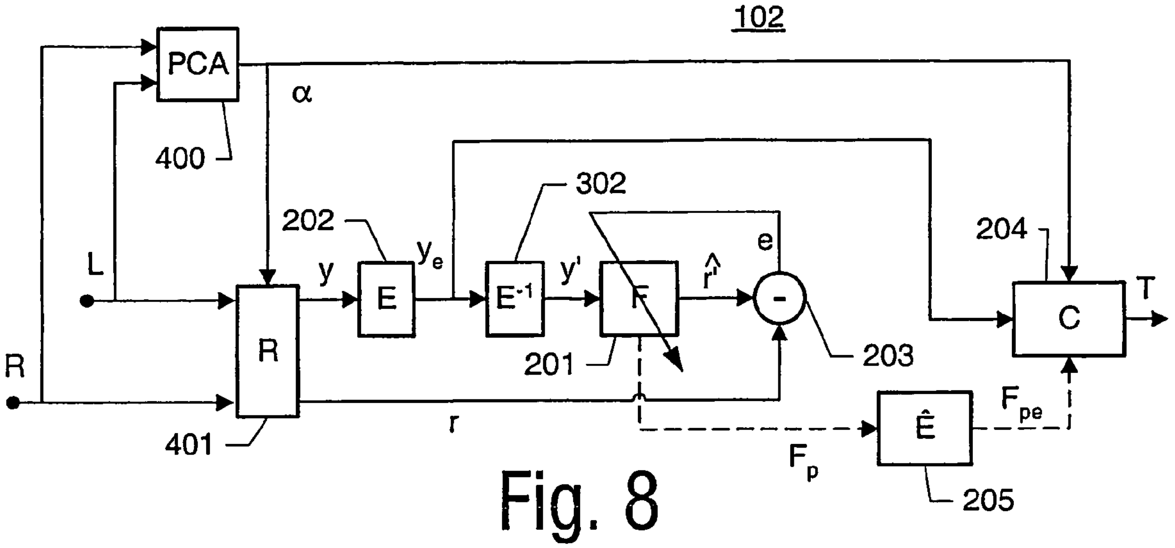
Figure 9:
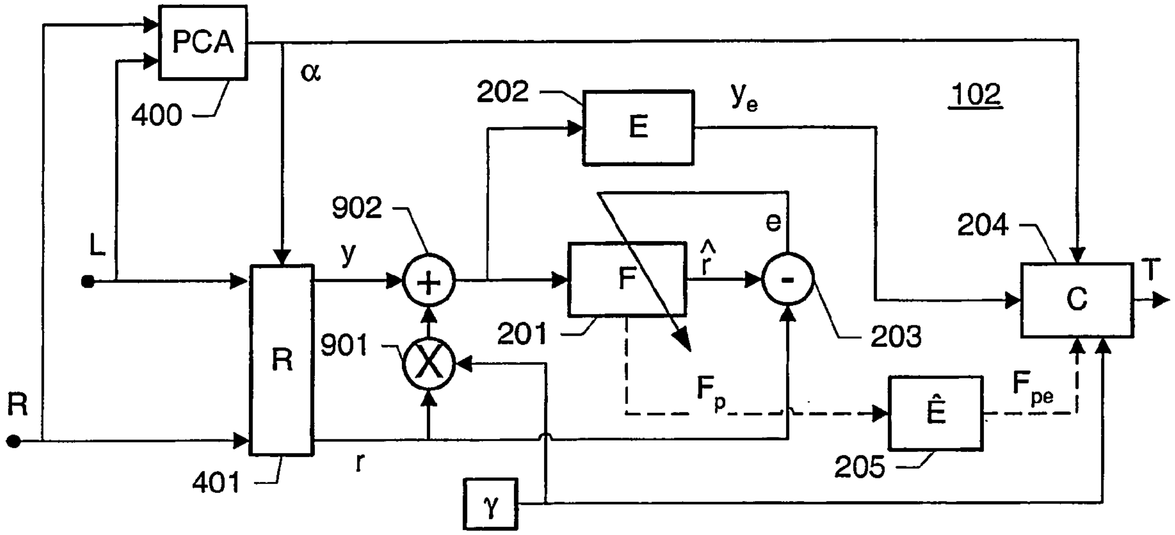
Figure 10:
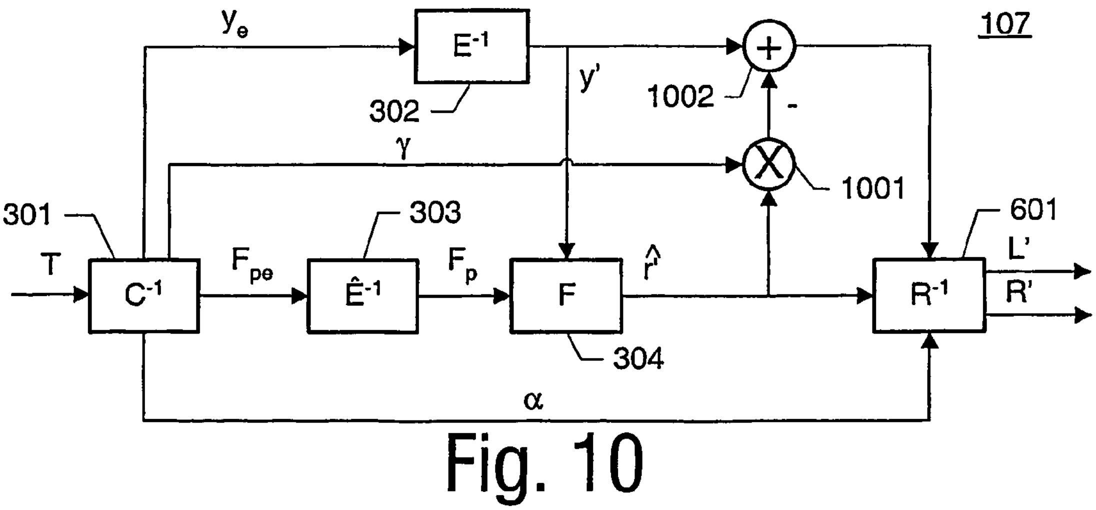
Figure 11:
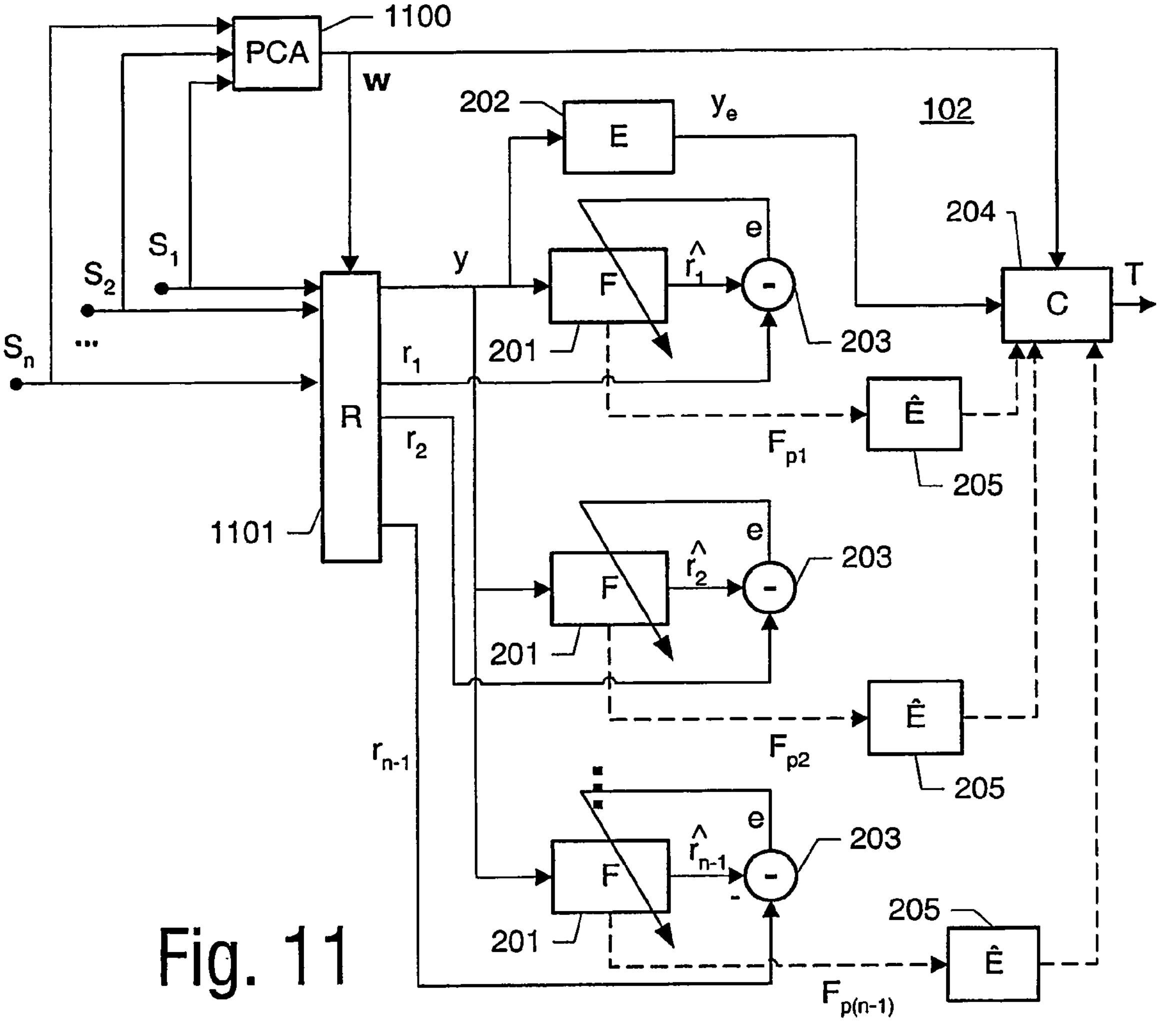
Figure 12:
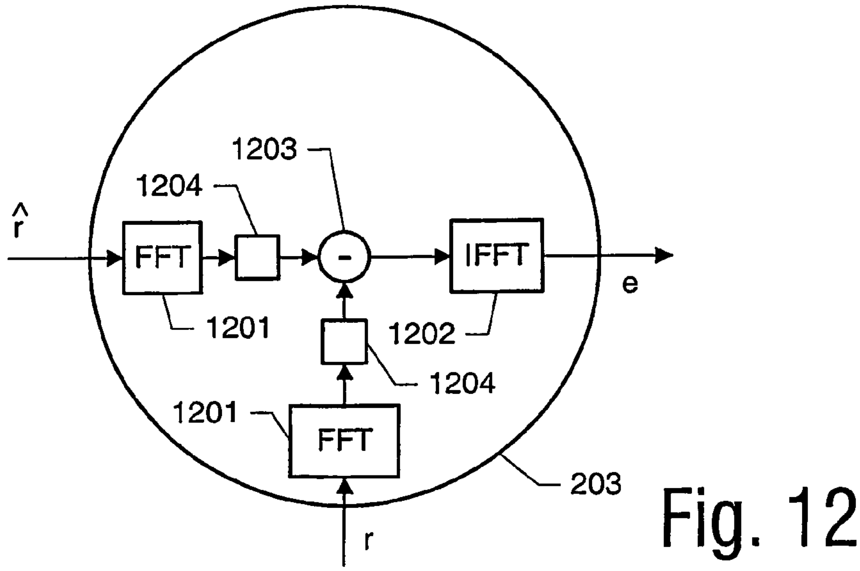

FIGS. 7*a-c* show schematic views of examples of a filter circuit for use in an embodiment of the invention;

FIG. 8 shows a Schematic view of an arrangement for encoding a stereo signal according to a third embodiment of the invention;

FIG. 9 shows a schematic view of an arrangement for encoding a stereo signal according to a fourth embodiment of the invention;

FIG. 10 shows a schematic view of an arrangement for decoding a stereo signal according to the fourth embodiment of the invention;

FIG. 11 shows a schematic view of an arrangement for encoding a multichannel signal according to a fifth embodiment of the invention; and FIG. 12 shows a schematic view of a subtraction circuit for use with an embodiment of the invention.

Figure 1:
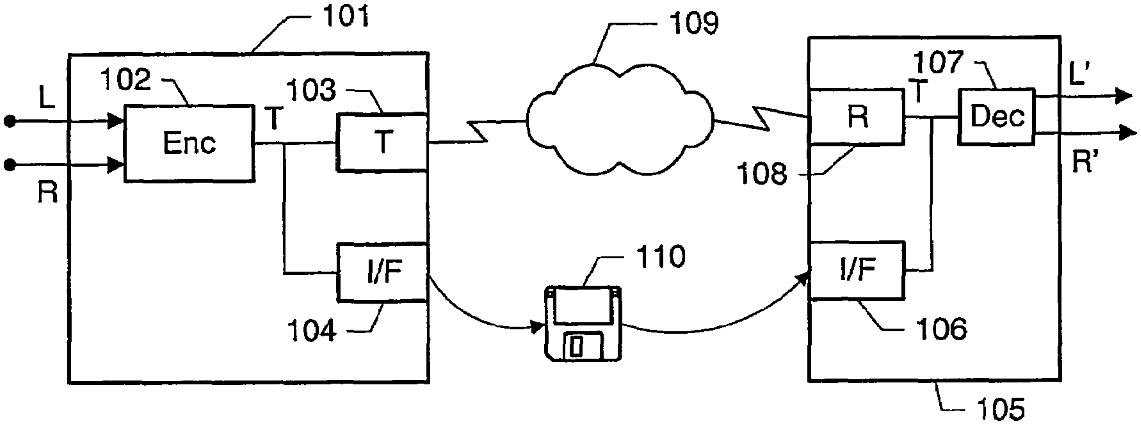
FIG. 1 shows a schematic view of a system for communicating stereo signals according to an embodiment of the invention.

FIG. 1 shows a schematic view of a system for communicating stereo signals according to an embodiment of the invention. The system comprises a coding device 101 for generating a coded stereophonic signal and a decoding device 105 for decoding a received coded signal into a stereo L signal and a stereo R signal component. The coding device 101 and the decoding device 105 each may be any electronic equipment or part of such equipment. Here the term electronic equipment comprises computers, such as stationary and portable PCs, stationary and portable radio communication equipment and other handheld or portable devices, such as mobile telephones, pagers, audio players, multimedia players, communicators, i.e. electronic organisers, smart phones, personal digital assistants (PDAs), handheld computers, or the like. It is noted that the coding device 101 and the decoding device may be combined in one electronic equipment where stereophonic signals are stored on a computer-readable medium for later reproduction.

The coding device 101 comprises an encoder 102 for encoding a stereophonic signal according to the invention, the stereophonic signal including an L signal component and an R signal component. The encoder receives the L and R signal components and generates a coded signal T. The stereophonic signal L and R, may originate from a set of microphones, e.g. via further electronic equipment, such as a mixing equipment, etc. The signals may further be received as an output from another stereo player, over-the-air as a radio signal, or by any other suitable means. Preferred embodiments of such an encoder according to the invention will be described below. According to one embodiment, the encoder 102 is connected to a transmitter 103 for transmitting the coded signal T via a communications channel 109 to the decoding device 105. The transmitter 103 may comprise circuitry suitable for enabling the communication of data, e.g. via a wired or a wireless data link 109. Examples of such a transmitter include a network interface, a network card, a radio transmitter, a transmitter for other suitable electromagnetic signals, such as an LED for transmitting infrared light, e.g. via an IrDa port, radio-based communications, e.g. via a Bluetooth transceiver, or the like. Further examples of suitable transmitters include a cable modem, a telephone modem, an Integrated Services Digital Network (ISDN) adapter, a Digital Subscriber Line (DSL) adapter, a satellite transceiver, an Ethernet adapter, or the like. Correspondingly, the communications channel 109 may be any suitable wired or wireless data link, for example of a packet-based communications network, such as the Internet or another TCP/IP network, a short-range communications link, such as an infrared link, a Bluetooth connection or another radio-based link. Further examples of the communications channel include computer networks and wireless telecommunications networks, such as a Cellular Digital Packet Data (CDPD) network, a Global System for Mobile (GSM) network, a Code Division Multiple Access (CDMA) network, a Time Division Multiple Access Network (TDMA), a General Packet Radio service (GPRS) network, a Third Generation network, such as a UMTS network, or the like. Alternatively or additionally, the coding device may comprise one or more other interfaces 104 for communicating the coded stereo signal T to the decoding device 105. Examples of such interfaces include a disc drive for storing data on a computer-readable medium 110, e.g. a floppy-disk drive, a read/write CD-ROM drive, a DVD-drive, etc. Other examples include a memory card slot a magnetic card reader/writer, an interface for accessing a smart card, etc. Correspondingly, the decoding device 105 comprises a corresponding receiver 108 for receiving the signal transmitted by the transmitter and/or another interface 106 for receiving the coded stereo signal communicated via the interface 104 and the computer-readable medium 110. The decoding device further comprises a decoder 107 which receives the received signal T and decodes it into corresponding stereo components L' and R'. Preferred embodiments of such a decoder according to the invention will be described below. The decoded signals L' and R' may subsequently be fed into a stereo player for reproduction via a set of speakers, head-phones, or the like.

Figure 2:
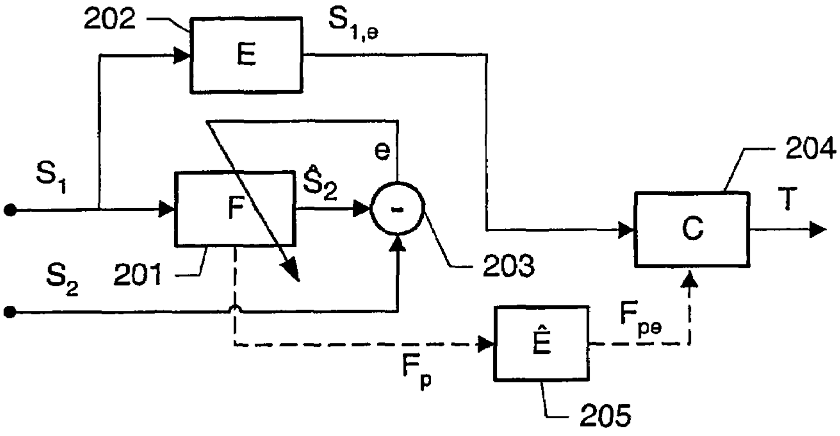
FIG. 2 shows a schematic view of an arrangement for encoding a multichannel signal according to a first embodiment of the invention.

FIG. 2 shows a schematic view of an arrangement for encoding a multichannel signal according to a first embodiment of the invention. According to this embodiment, the multichannel signal comprises two components $S_1$ and $S_2$. The arrangement comprises an adaptive filter 201 receiving the signal component $S_1$ as an input and generating a filtered signal $\hat{S}_2$. The filter parameters $F_p$ of the adaptive filter are selected such that the filtered signal $\hat{S}_2$ approximates the second signal component $S_2$, e.g. by controlling the adaptive filter 201 by the error signal e indicating the difference between $S_2$ and $\hat{S}_2$ as generated by a subtraction circuit 203. The filter 201 may be any suitable filter known in the art. Examples of such filters include a finite impulse response (FIR) filter or a infinite impulse response (IIR) filter, adaptive or fixed, with the cut-off frequencies and magnitudes being fixed or tracked recursively, or the like. The filter may be of any order, preferably smaller than 10. The type of the filter can be Butterworth, Chebychev, or any other suitable type of filter. In the example of audio signals, examples of such adaptive filters include an adaptive filter known from the field of echo cancellation, or a filter based on a psychoacoustic model of the human auditory system, e.g. as is known from MPEG coding, thereby reducing the number of filter parameters. According to another embodiment the filter may further be simplified, e.g. by using a $10^{th}$ order filter using 5 BiQuadratic filters and an artificial reverberation unit. In this embodiment, at the encoding side, the filter is fitted and the reverberation time is determined. These parameters are varying slowly, thereby reducing the necessary bit rate for their transmission.

The resulting filter parameters $F_p$ are fed into an encoder 205, e.g. an encoder providing a Huffman encoding or any other suitable coding scheme, resulting in encoded filter parameters $F_{pe}$. The encoded filter parameters $F_{pe}$ are fed into a combiner circuit 204. The arrangement further comprises encoders 202 performing a proper encoding of the signal component $S_1$. For example, in the case of audio signals, the signal $S_1$ may be encoded according to MPEG, e.g. MPEG I layer 3 (MP3), according to sinusoidal coding (SSC), or audio coding schemes based on subband, parametric, or transform schemes, or any other suitable schemes or combination thereof. The resulting coded signal $S_{1,e}$ is fed into the combiner circuit 204 together with the filter parameters $F_p$. The combiner circuit 204 performs framing, bit-rate allocation, and lossless coding, resulting in a combined signal T to be communicated.

Figure 3:
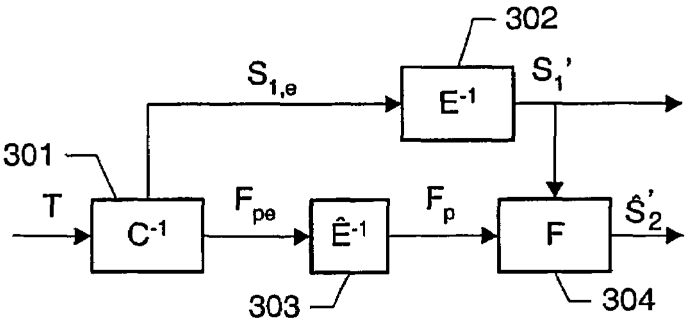
FIG. 3 shows a schematic view of an arrangement for decoding a multichannel signal according to the first embodiment of the invention.

FIG. 3 shows a schematic view of an arrangement for decoding a multichannel signal according to the first embodiment of the invention. The arrangement receives a coded multichannel signal T, for example originating from an encoder according to the embodiment described in connection of FIG. 2. The arrangement comprises a circuit 301 for extracting the encoded signal $S_{1,e}$ and the encoded filter parameters $F_{pe}$ from the combined signal T, i.e. the circuit 301 performs an inverse operation of the combiner 204 of FIG. 2. The filter parameters are decoded by a decoder 303 corresponding to the encoding of the filter parameters by the encoder 205 of FIG. 2. The extracted signal $S_{1,e}$ is fed into a decoder 302 for performing audio decoding corresponding to the encoding performed by the encoder 202 of FIG. 2, resulting in the decoded first signal component signal $S_1'$. The signal $S_1'$ is fed into a filter 304 together with the decoded filter parameters $F_p$. The filter 304 generates a corresponding estimated second signal component $\hat{S}_2'$. Hence, the decoder of FIG. 2 generates an output corresponding to the received first signal component $S_1'$ and the estimated second signal component $\hat{S}_2'$.

Figure 4:
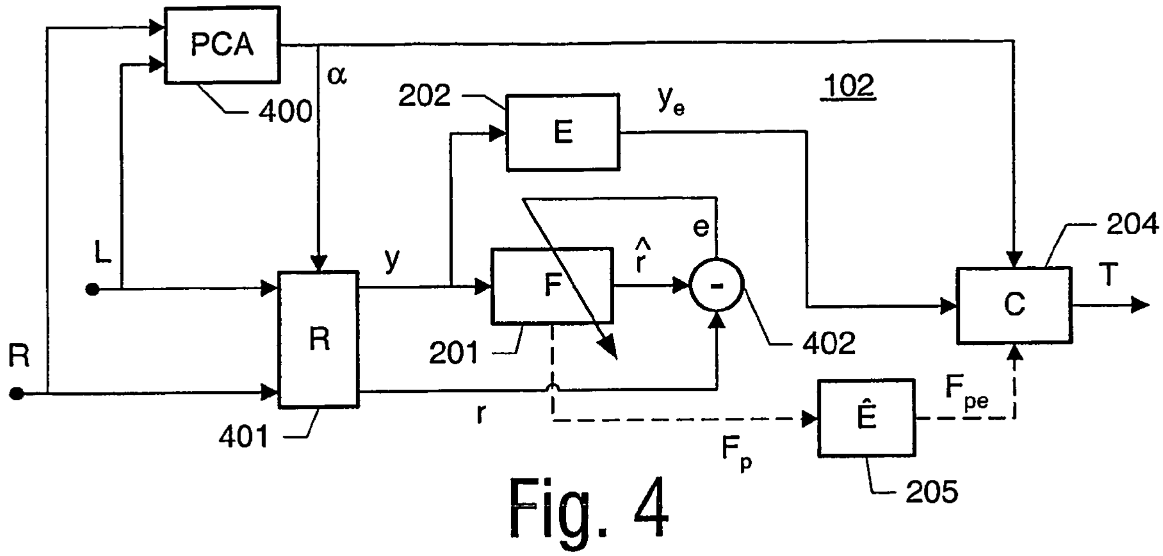
FIG. 4 shows a schematic view of an arrangement for encoding a stereo signal according to a second embodiment of the invention.

FIG. 4 shows a schematic view of an arrangement 102 for encoding a stereo signal according to a second embodiment of the invention. The arrangement comprises circuitry 401 for performing a rotation of the stereo signal in the L-R space by an angle α, resulting in rotated signal components y and r according to the transformation $$y=L\cos\alpha+R\sin\alpha w_L L+w_R R$$

$$r=-L\sin\alpha+R\cos\alpha=-w_R L+w_L R, \quad (1)$$

where $w_L$–cosα and $w_R$=sinα will be referred to as weighting factors.

According to this embodiment, the angle α is determined such that it corresponds to a direction of high signal variance. The direction of maximum signal variance, i.e. the principal component, may be estimated by a principal component analysis such that the rotated y component corresponds to the principal component signal which includes most of the signal energy, and r is a residual signal. Correspondingly, the arrangement of FIG. 4 comprises circuitry 400 which determines the angle α or, alternatively, the weight factors $w_L$ and $w_R$.

Figure 5:
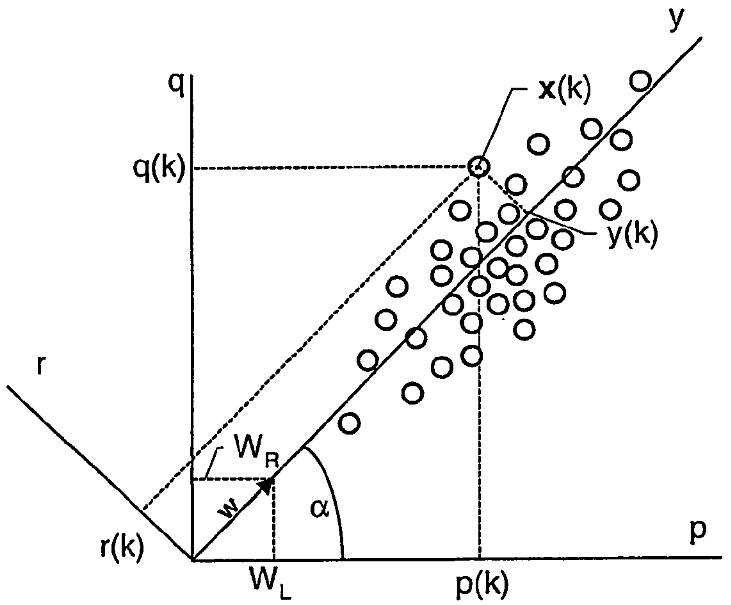
FIG. 5 illustrates the determination of the signal transformation according to an embodiment of the invention.

Referring to FIG. 5, according to a preferred embodiment, the above weight factors $w_L$ and $w_R$ are determined according the following algorithm:

Initially, the incoming stereo signals L and R are rectified and lowpass filtered, resulting in envelope signals p(k) of L and q(k) of R, respectively, where p(k) and q(k) are suitably sampled and the sample index is denoted k. Thus, the vector x(k)=(p(k), q(k)) denotes the incoming signal vector. Alternatively, the signals L and R may be used directly, i.e. without filtering, or other filtered versions of L and R may be used, e.g. highpass filtered signals L and R. In FIG. 5 a number of signal points are illustrated as circles. As an example, the signal point x(k) and its corresponding components p(k) and q(k) are indicated. According to the invention, the signals are rotated in the direction of the principal component of the signal vectors. In the example of FIG. 5, this corresponds to the y direction where a is the angle between the y direction and the p direction. The weight vector w=($w_L$, $w_R$) indicates the direction of the principal component, and the rotated components of x(k) are denoted y(k) and r(k), respectively.

The principal component may be determined by any suitable method known in the art. In a particularly advantageous embodiment, an iterative method utilising Oja's rule (see e.g. S. Haykin: "Neural Networks", Prentice Hall, N.J., 1999) is used. According to this embodiment, the weight vector w is iteratively estimated according to the following equation $$w(k)=w(k-1)+\mu[x(k-1)-w(k-1)\,y(k-1)], \quad (2)$$

where w(k)=($w_L$(k), $w_R$(k)) corresponds to the estimate at time k. The above iteration may, for example, be initiated with a set of small random weights w(0), or in any other suitable way. The above estimated weight vector may be used to calculate the rotated signal according to y(k)=$w^T$(k) x(k). Alternatively, the iteration of eqn. (2) may be performed on a block basis, e.g. for a block of N samples, where N depends on the particular implementation, for example, N=512, 1024, 2048, etc. In this embodiment, the estimated weight vector w(N) for a block may be used in the transformation of all samples of that block according to $y(k)=w^T(N)x(k)$.

The factor μin eqn. (2) corresponds to a time scale of the tracking algorithm. If μ=0, the weighting factors and, thus, the angle α, remain constant, while they change rapidly for large μ. As an example, for a block size of 2048 samples, μ may be selected of the order of $10^{-3}$ for a sampling rate of 44.1 kHz.

It is an advantage of the above iterative algorithm that it is linear, i.e. it does not require the calculation of any trigonometric functions, square roots or the like. It is a further advantage, that the above iteration yields a normalised weight vector w, as the term —μw(k−1)y(k−1) in eqn. (2) corresponds to a weight decay term penalising large weights while the term +μx(k−1) drives the weight vector in the direction of the principal component. It is further noted that in the present embodiment, since x(k) is the envelope signal, $w_L, w_R \in [0,1]$, i.e. the weight vector w lies in the first quadrant in FIG. 5, thereby ensuring that μ is positive. It is a further advantage of this embodiment that it suffices to transmit one of $w_L$ and $w_R$, as the other factor may be determined according to $w_R=\sqrt{1-(w_L)^2}$. Alternatively, the angle α may be transmitted.

Again referring to FIG. 4, the circuit 400 outputs the determined angle αor, alternatively, one or both of the weight factors $w_L$ and $w_R$. The angle information is fed into the rotation circuit 401 which generates the rotated signal components y and r. It is understood that the circuits 400 and 401 may be combined in a single circuit performing the iterative calculation of eqn. (2) and the calculation of y and r according to eqn. (1).

According to this embodiment of the invention, it is recognised that the residual signal r may be estimated as a filtered version of the principal signal y. In an acoustic recording of an audio source recorded by two microphones in the absence of acoustic distortions, e.g. due to reflections, etc., the principal signal y corresponds to the audio source and the residual signal is substantially zero. For example, the stereo signals L and R may be expressed as L=M+S and R=M−S, where M corresponds to a mid or centre signal and S corresponds to a stereo or side signal. In the case of an acoustic recording of a stationary sound source, e.g. a speaker recorded by two microphones, the L and R signals are substantially equal, if the speaker is positioned exactly between the microphones and assuming that there are no acoustic distortions such as reflections, etc. Hence, in this case S is substantially zero or at least small and the coding scheme according to this embodiment substantially yields y corresponding to L+R and r corresponding to L−R being zero or small; this corresponds to α=45 degrees. If the speaker is not positioned exactly between the microphones, i.e. there is an asymmetry, but still assuming that there are no reflections or other distortions, the rotated signal y according to the invention still corresponds to the speaker and the residual signal r is substantially zero. However, in this case the angle α differs from 45 degrees.

In a more realistic situation distortions are present, e.g. due to reflections of the signal at the walls of a room and at the head and torso of the speaker, etc. These effects influence the residual signal r. Consequently, when estimating the residual signal by a filter, the filter in effect models the room acoustics, etc. For a classical orchestra the situation is similar, while in the case of modem pop music the situation may be slightly different. In this case, a sound engineer typically mixes multiple channels into two channels, often using artificial reverberation, effect boxes etc. In this case the filter models the acoustic effects introduced by the mixing process.

Accordingly, still referring to FIG. 4, the arrangement further comprises an adaptive filter 201 receiving the principal signal y as an input and generating a filtered signal . The filter parameters $F_p$ of the adaptive filter are selected such that the filtered signal approximates the residual signal r, e.g. by controlling the adaptive filter 201 by the error signal e indicating the difference between and r̂as generated by a subtraction circuit 402. The resulting filter parameters $F_p$ are fed into an encoder 205, e.g. an encoder providing a Huffman encoding or any other suitable coding scheme, resulting in encoded filter parameters $F_{pe}$. The encoded filter parameters $F_{pe}$are fed into a combiner circuit 204. The filter 201 may be any suitable filter known in the art. Example of such filters include a finite impulse response (FIR) filter or a infinite impulse response (TIE) filter, adaptive or fixed, with the cut-off frequencies and magnitudes being fixed or tracked recursively, or the like. The filter may be of any order, preferably smaller than 10. The type of the filter can be Butterworth, Chebychev, or any other suitable type of filter. The arrangement further comprises an encoder 202 for encoding the principal signal as described in connection with FIG. 2, resulting in the encoded principal signal $Y_e$ which is fed into the combiner circuit 204 together with the filter parameters $F_p$ and the angle information a. As described in connection with FIG. 2, the combiner circuit 204 performs framing, bit-rate allocation, and lossless coding, resulting in a combined signal T to be communicated which includes the encoded principal signal $Y_e$, the filter parameters $F_p$ and the angle information α. In one embodiment, the angle α or, alternatively, $W_L$ and/or $W_R$ may be communicated as part of a header transmitted prior to a signal frame, a signal block, or the like.

According to the invention, as the transformation angle α is tracked such that the principal component signal includes most of the signal energy, the bit rates allocated to the y and r signals may be selected to be different, thereby optimising the coding efficiency. As described above, in the example of an acoustic recording of an audio source recorded by two microphones in the absence of acoustic distortions, the principal signal y corresponds to the audio source and the residual signal is substantially zero. In this example, the angle α corresponds to the position of the sound source relative to the microphones. If the sound source moves, e.g. from left to right, the method according to the invention still yields a principal component signal y corresponding to the source and a small residual signal r, ideally being r=0. In this case, a changes form 0 (fully left) to 90 degrees (fully right). The above example illustrates the advantage of tracking the angle α. Hence, it is an advantage of the invention that it allows an efficient coding of stereo signals.

According to this embodiment of the invention, the bit rate to be allocated to the filter parameters $F_p$ may be considerably smaller than the bit rate necessary for the principal signal y, e.g. in one embodiment, the bit-rate for $F_p$ may, on average, be less than 10% of the bit rate for y. Hence, it is an advantage of the invention that it reduces the bit rate necessary for transmitting a stereo signal. The total bit rate according to the invention is only slightly higher than for a single mono channel. It is noted, however, that this ratio may vary during a recording. For example, the ratio may become smaller, e.g. in a situation with little distortions and a stationary source, but also larger, e.g. if the L and R signals are momentarily independent.

Figure 6:
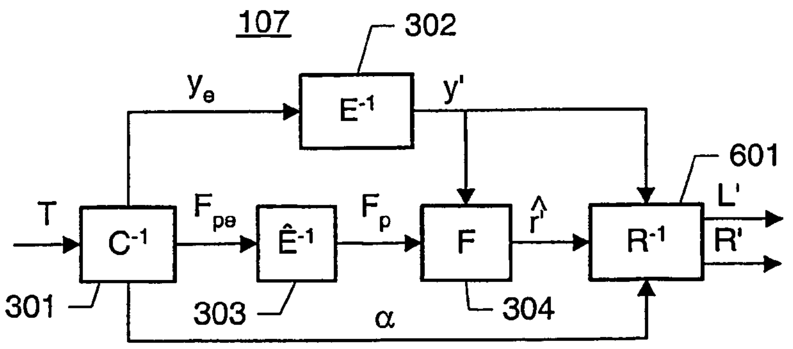
FIG. 6 shows a schematic view of an arrangement for decoding a stereo signal according to the second embodiment of the invention.

FIG. 6 shows a schematic view of an arrangement 107 for decoding a stereo signal according to the second embodiment of the invention. The arrangement receives a coded stereo signal T, for example originating from an encoder according to the embodiment described in connection with FIG. 4. The arrangement comprises a circuit 301 for extracting the encoded signals $y_e$, the encoded filter parameters $F_{pe}$, and the angle information a from the combined signal T, i.e. the circuit 301 performs an inverse operation of the combiner 204 of FIG. 4. The extracted signal $y_e$ is fed into a decoder 302 for performing audio decoding corresponding to the encoding performed by the encoder 202 of FIG. 4, resulting in the decoded principal component signal y'. The encoded filter parameters $F_{pe}$ are decoded by a decoder 303 corresponding to the encoding of the filter parameters by the encoder 205 of FIG. 4. The signal y' is fed into a filter 304 together with the decoded filter parameters $F_p$. The filter 304 generates a corresponding estimated residual signal ρ'. The received principal component signal y', the estimated residual signal ρ' and the received angle information a are fed into a rotation circuit 601 which rotates the signals y', ρ' back in the direction of the original L and R components, thus resulting in the received signals L' and R'.

In the embodiment described in connection with FIGS. 4 and 6, the filters 201 and 304 may be standard adaptive filters in the temporal or time domain (see e.g. "Adaptive Filter Theory", by S. Haykin, Prentice Hall, 2001), e.g. an adaptive filter known from the field of echo cancellation. Other examples of filters include a fixed FIR or IIR filter with a fixed or adaptive cut-off-frequency and magnitude. Alternatively, the filter may be based on a psychoacoustic model of the human auditory system or another suitable filter, e.g. using a $10^{th}$ order filter using 5 BiQuadratic filters and an artificial reverberation unit, as described in connection with FIG. 2.

FIGS. 7*a-c* show schematic views of examples of a filter circuit for use in an embodiment of the invention.

In the example of FIG. 7*a*, the filter 201 comprises a combination of a filter 701 and a reverberation filter 702. For example, the filter 701 may be a standard adaptive filter in the temporal or time domain, a fixed FIR or IIR filter with a fixed or adaptive cut-off-frequency and magnitude, etc., e.g. a high-pass filter. According to this embodiment, both the filter parameters of the filter 701 and the parameters of the reverberation filter 702, such as the reverberation time denoted $T_{60}$, are transmitted to the decoder as filter parameters $F_p$.

In the example of FIG. 7*b*, in addition to the filters 701 and 702, two control circuits 703-704 are added. A control circuit 703 is added to ensure that the average power of the residual signal r and the average power of the output of the reverberator 702 are approximately the same, e.g. by multiplying the output of the reverberator 702 with a parameter $\beta_1$. A second control circuit 704 multiplies the scaled output of the reverberator with $\beta_2$. The factor $\beta_2$ may be selected in the range between −3 dB and +6 dB and it is determined such that the cross correlation ρ between r and ρ is as high as possible, i.e. that the signals r and ρ are as similar as possible. Hence, the filter arrangement of FIG. 7*b* further comprises a circuit 705 for determining the cross correlation ρ. The filter arrangement further comprises a multiplier 706 for generating the product $\beta=\beta_1\cdot\beta_2$ which is output as a part of the filter parameters $F_p$. Hence, $\beta_1$ is a gain that is automatically controlled, e.g. by comparing the absolute mean of r and ρ, and β2 is another gain that is automatically controlled, e.g. by use of the cross-correlation coefficient ρ. The first gain is intended to make sure that the energy of r is preserved, i.e. that the energy of the predicted signal ρ' at the receiver corresponds to the energy of r. The second gain is to make sure that r and ρ' are well correlated.

In one embodiment, the reverberator 702 and the filter 701 may be fixed, i.e. not adapted according to the filter parameters $F_p$. Further, β2 may be fixed, thereby leaving the slowly varying parameter $\beta_1$ as the only adaptive parameter which needs to be adjusted and transmitted. Consequently, a particularly simple filter arrangement is provided. It is an advantage of this embodiment that it only requires about half the original stereo bit rate for transmitting a stereo signal. It is noted that further variations of the above embodiment may be used. For example, in one embodiment the filter 701 may be left out.

Furthermore, alternatively or additionally to the correlation p, other measures of correlation may be used to ensure a high degree of similarity between the original signal and the signal after encoding-decoding. For example, in one embodiment two correlators may be used instead of correlator 705. One correlator may compute the cross-correlation $\rho_{LR}$ of the input signals L and R. Furthermore, a second correlator may compute the cross correlation $\rho'_{LR}$ of the resulting outputs L' and R' of the encoder-decoder, i.e. according to this embodiment, the encoder further comprises a decoder circuit for determining the signals L' and R'. This embodiment uses the difference $\epsilon_{\rho LR}=\rho_{LR}-\rho'_{LR}$ to control $\beta_2$ such that $\epsilon\rho$ is minimal. This is illustrated in FIG. 7*c*, where the correlator of FIG. 7*b* is replaced by circuit 707 which receives the signals L and R as well as L' and R' as inputs and generates as an output a signal indicative of the difference $\epsilon_p$. The output $\epsilon_p$ of circuit 707 controls circuit 704 to scale the estimated residual ρ such that $\epsilon_p$ is minimised. In one embodiment, the inputs to circuit 707 are high-pass filtered, e.g. at 250 Hz, such that the low frequencies have a decreasing contribution to $\epsilon_\rho$. As in the embodiment of FIG. 7*b*, it is an advantage of this embodiment that the correlation between the resulting stereo image and the original stereo image before the coding-decoding is very high.

FIG. 8 shows a schematic view of an arrangement for encoding a stereo signal according to a third embodiment of the invention. The arrangement is a variation of the embodiment described in connection with FIG. 4, and it comprises circuitry 401 for performing a rotation of the stereo signals L and R, circuitry 400 for determining the angle of rotation, an adaptive filter 201, a subtraction circuit 203, an encoder 202, an encoder 205, and a combiner circuit 204, as described in connection with FIG. 4. According to this embodiment, the principal component signal y is not directly fed into the filter 201. Instead, the arrangement further comprises a decoder 302 as described in connection with FIG. 6. The decoder 302 receives the encoded principal component signal $y_e$ generated by the encoder 202 and generates the decoded principal signal y' which is fed into the filter 201. It is an advantage of this embodiment that it reduces the effect of coding errors introduced by the coding and decoding of the signal y. These coding errors cause the decoded signal y' to be slightly different from the original signal y due to the fact that the decoder 302 in practice is not a perfect inverse of the encoder 202, i.e. $E\,E^{-1}\neq 1$. Consequently, by applying an encoding and decoding of the signal y at the decoder, the input y' to the filter 201 corresponds to the input y' fed into the filter 304 (of FIG. 6) at the receiver, thereby improving the result of the prediction of ρ' of the residual signal at the receiver. Hence, the encoder according to this embodiment may be used in connection with a decoder according to the embodiment of FIG. 6.

FIG. 9 shows a schematic view of an arrangement for encoding a stereo signal according to a fourth embodiment of the invention. The arrangement is a variation of the embodiment described in connection with FIG. 4, and it comprises circuitry 401 for performing a rotation of the stereo signals L and R, circuitry 400 for determining the angle of rotation, an adaptive filter 201, a subtraction circuit 203, an encoder 202, an encoder 205, and a combiner circuit 204, as described in connection with FIG. 4. According to this embodiment, the principal component signal y is not directly fed into the filter 201. Instead, the arrangement further comprises a multiplication circuit 901 multiplying the residual signal r received from circuit 401 with a constant γ, and an adding circuit 902 for adding the scaled residual signal to the principal component signal y, resulting in a signal y+γr which is fed into the filter 201. Here, γ is a small positive value, e.g. of the order of $10^{-2}$. In one embodiment, the constant γ is tracked adaptively. It is an advantage of this embodiment that frequencies which are substantially not present in the spectrum of the signal y but present in the spectrum of r may be utilised in the modelling of the residual signal ρ by the filter 201, thereby improving the quality of the coded signal. According to this embodiment the signal y+γ r is fed into the encoder 202 which generates the decoded principal signal $y_e$ to be transmitted to the receiver. Furthermore, according to this embodiment, the constant γ is fed into the combiner 204 and transmitted to the receiver.

FIG. 10 shows a schematic view of an arrangement for decoding a stereo signal according to the fourth embodiment of the invention, i.e. suitable for decoding a signal received from an encoder according to FIG. 9. The arrangement comprises a circuit 301 for extracting the received information from the combined signal T, a decoder 302, a decoder 303, a filter 304, and a rotation circuit 601 as described in connection with FIG. 6. According to this embodiment, the circuit 301 further extracts the constant γ from the combined signal T, and the arrangement further comprises a multiplication circuit 1001 for multiplying the predicted residual signal ρ' generated by the filter 304 with the received constant γ. The arrangement further comprises a circuit 1002 for subtracting the resulting scaled predicted residual signal γρ' from the decoded principal signal γ'.

FIG. 11 shows a schematic view of an arrangement for encoding a multi-channel signal according to a fifth embodiment of the invention. The arrangement receives a multi-channel signal comprising n channels $S_1, \ldots S_n$. The arrangement comprises a principal component analyser 1100 for performing a principal component analysis of the signal components $S_1, \ldots, S_n$, resulting in a weight vector $w=(w_1, \ldots, w_n)$ for transforming the input signal into a principal component signal y and n-1 residual signals $r_1, r_2, \ldots, r_{n-1}$. The arrangement further comprises a transformation circuit 1101 receiving the input signal components $S_1, \ldots, S_n$ and the determined weight vector w, and generating the signals y and $r_1, \ldots, r_{n-1}$ according to the above transformation. The principal component signal y is fed into a set of adaptive filters 201, each predicting one of the residual signals $r_1, \ldots, r_n$, as described in connection with FIG. 4, resulting in corresponding filter parameters $F_{p1}, \ldots, F_{p(n-1)}$ which are fed into corresponding encoders 205 and, subsequently, into the combiner 204. At a corresponding decoder (not shown), corresponding filters are used for generating estimates $\rho'_1, \ldots, \rho'_{n-1}$ of the residual signals based on the filter parameters, as described in connection with FIG. 6. The arrangement further comprises an encoder 202 for encoding the principal component signal y, resulting in an encoded signal $y_e$ which is also fed into the combiner 204.

It is understood that, according to one embodiment, only a subset of residual signals, e.g. $r_1, \ldots, r_k$, k<n−1, may be transmitted to the receiver or fed into corresponding filters, thereby reducing the necessary bit rate while maintaining most of the signal quality.

FIG. 12 shows a schematic view of a subtraction circuit for use with an embodiment of the invention. In the above embodiments, the filter parameters are determined by comparing a target signal with an estimated signal, i.e. by the error signal e indicating the difference between r and ρ as generated by a subtraction circuit 203. It is understood that the subtraction circuit may generate different measures of difference between r and ρ, for example a difference may be determined in the time domain or in the frequency domain. Referring to FIG. 12, the circuit 203 may comprise circuits 1201 for transforming the signals r and ρ, respectively, into the frequency domain, e.g. by performing a fast Fourier transformation (FFT). The resulting frequency components may be further processed by respective circuits 1204. For example different frequencies may be weighted differently, preferably according to the properties of the human auditory system, thereby weighting differences in the audible frequency range more strongly. Other examples of further processing by the circuits 1204 include an averaging over predetermined frequency components, calculating the magnitude of the complex frequency components, clustering of filter components, or the like. For example, in a preferred embodiment, a clustering is performed prior to the subtraction in the frequency domain. This clustering may be performed using a filter-bank, e.g. with linear or logarithmic sub-bandwidths. Alternatively, the clustering may be performed using the so-called equivalent rectangular bandwidth (ERB) (see e.g. "An introduction to the Psychology of Hearing", by Brian Moore, Academic Press, London, 1997). The equivalent rectangular bandwidth technique clusters frequency-bands that correspond to the human auditory filters, e.g. the so-called critical bands. According to this embodiment, the corresponding value of the ERB as a function of centre frequency, f (in kHz), is may be calculated according to ERB=24.7(4.37 f+1). Still referring to FIG. 12, the circuit 203 further comprises a subtraction circuit 1203 for subtracting the processed frequency components. Alternatively, the transformed signals generated by the circuits 1201 are directly fed into the subtraction circuit 1204 without further processing. The difference signal generated by the subtraction circuit 1204 is fed into a transformation circuit 1202 for transforming the error signal back into the time domain, e.g. by performing an inverse fast Fourier transform (IFFT). Alternatively, the difference signal in the frequency domain may be used directly.

It is understood that a skilled person may adapt the above embodiments, e.g. by adding or removing features, or by combining features of the above embodiments. For example, it is understood that the features introduced in embodiments of FIGS. 8 and 9 may be incorporated in the embodiment of FIG. 11 as well. As another example, the error signal e describing the quality of the estimated residual signal in the embodiment of FIG. 4 may be compared to a threshold error indicating a maximum acceptable error. If the error is not acceptable, the error signal may, after suitable coding, be transmitted together with the signal T similar to the methods used within the field of Linear Predictive Coding (LPC).

It is further noted that the invention is not limited to stereophonic signals, but may also be applied to other multi-channel input signals having two or more input channels. Examples of such multi-channel signals include signals received from a Digital Versatile Disc (DVD) or a Super Audio Compact Disc, etc. In this more general case, a principal component signal y and one or more residual signals r may still be generated according to the invention. The number of residual signals transmitted depends on the number of channels and the desired bit rate, as higher order residuals may be omitted without significantly degrading the signal quality.

In general, it is an advantage of the invention that bit-rate allocation may be adaptively varied, thereby allowing graceful degradation. For example, if the communication channel momentarily only allows a reduced bit rate to be transmitted, e.g. due to increased network traffic, noise, or the like, the bit rate of the transmitted signal may be reduced without significantly degrading the perceptible quality of the signal. For example, in the case of a stationary sound source discussed above, the bit rate may be reduced by a factor of approximately two without significantly degrading the signal quality, corresponding to transmitting a single channel instead of two.

It is noted that the above arrangements may be implemented as general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word 'comprising' does not exclude the presence of other elements or steps than those listed in a claim. The invention can be implemented by means of hardware comprising several distinct elements, and by means of a suitably programmed computer. In a device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of encoding a multi-channel signal including at least a first signal component and a second signal component, the first signal component being a principal component signal of a multi-channel source signal including a number of source signal components and the second signal component being a corresponding residual signal; the method comprising the acts of:

determining a set of filter parameters of a prediction filter such that the prediction filter provides an estimate of the second signal component when receiving the first signal component as an input;

controlling the prediction filter by an error signal indicative of a difference of the second signal component and the estimate of the second signal component;

representing the multi-channel signal as the first signal component and the set of filter parameters; and transforming at least first and second source signal components of the multi-channel source signal by a predetermined transformation into the principal component signal including most of the signal energy and at least the residual signal including less energy than the principal component signal, the predetermined transformation being parameterized by at least one transformation parameter;

wherein the act of representing the multi-channel signal as the first signal component and the set of filter parameters further comprises the act of representing the multi-channel signal as the principal component signal, the set of filter parameters, and the at least one transformation parameter.

2. The method according to claim 1, wherein the act of determining the set of filter parameters comprises the act of determining the filter parameters such that the error signal is smaller than a predetermined value.

3. The method according to claim 1, wherein the act of representing the multi-channel signal as the first signal component and the set of filter parameters further comprises the act of representing the multi-channel signal as the first signal component, the set of filter parameters, and the error signal if the error signal is not smaller than a predetermined value.

4. The method according to claim 1, further comprising the act of transforming at least the first and second source signal components of the multi-channel source signal into the first and second signal components.

5. The method according to claim 1, wherein the multi-channel source signal comprises a stereophonic signal including a left signal component and a right signal component.

6. A method of encoding a multi channel signal including at least a first signal component and a second signal component, the method comprising the acts of:

determining a set of filter parameters of a prediction filter such that the prediction filter provides an estimate of the second signal component when receiving the first signal component as an input; and representing the multi channel signal as the first signal component and the set of filter parameters; wherein said first signal component is a principal component signal of a source multi-channel signal including a number of source signal components and the second signal component is a corresponding residual signal;

the method further comprises the act of transforming at least the first and second source signal components by a predetermined transformation into the principal component signal including most of the signal energy and at least the residual signal including less energy than the principal component signal, the predetermined transformation being parameterized by at least one transformation parameter; and the act of representing the multi-channel signal as the first signal component and the set of filter parameters further comprises the act of representing the multi-channel signal as the principal component signal, the set of filter parameters, and the at least one transformation parameter.

7. The method according to claim 6, wherein the predetermined transformation is a rotation and the at least one transformation parameter corresponds to an angle of rotation.

8. A method of encoding a multi channel signal including at least a first signal component and a second signal component, the first signal component being a principal component signal of a multi-channel source signal including a number of source signal components and the second signal component being a corresponding residual signal; the method comprising the acts of:

determining a set of filter parameters of a prediction filter such that the prediction filter provides an estimate of the second signal component when receiving the first signal component as an input;

representing the multi channel signal as the first signal component and the set of filter parameters; and transforming at least first and second source signal components of the multi-channel source signal by a predetermined transformation into the principal component signal including most of the signal energy and at least the residual signal including less energy than the principal component signal, the predetermined transformation being parameterized by at least one transformation parameter;

wherein the act of representing the multi-channel signal as the first signal component and the set of filter parameters further comprises the act of representing the multi-channel signal as the principal component signal, the set of filter parameters, and the at least one transformation parameter, and wherein the act of determining a set of filter parameters further comprises the act of determining at least one scaling parameter for scaling the estimate of the second signal component such that a measure of correlation between the second signal component and the estimate of the second signal component is increased.

9. A method of decoding multi-channel signal information, the method comprising the acts of:

receiving a first signal component and a set of filter parameters of an adaptive filter controlled by an error signal indicative of a difference of a second signal component and an estimate of the second signal component, wherein the act of receiving the first signal component further comprises the act of receiving at least one transformation parameter, the first signal component corresponding to a result of a predetermined transformation of at least a first source signal component and a second source signal component of a source multi-channel signal, the predetermined transformation being parameterized by the at least one transformation parameter;

estimating the second signal component using a prediction filter corresponding to the received set of filter parameters of the adaptive filter, the prediction filter receiving the received first signal component as an input; and generating a first decoded signal component and a second decoded signal component by inversely transforming the received first signal component and the estimated second signal component.

10. A method of decoding multi-channel signal information, the method comprising the acts of:

receiving a first signal component and a set of filter parameters; and estimating a second signal component using a prediction filter corresponding to the received set of filter parameters, the prediction filter receiving the received first signal component as an input; wherein the act of receiving the first signal component further comprises the act of receiving a transformation parameter, the first signal component corresponding to a result of a predetermined transformation of at least a first source signal component and a second source signal component of a source multi-channel signal, the predetermined transformation being parameterized by at least the transformation parameter; and the method further comprises the act of generating a first decoded signal component and a second decoded signal component by inversely transforming the received first signal component and the estimated second signal component.

11. An arrangement for encoding a multi-channel signal including at least a first signal component and a second signal component, the first signal component being a principal component signal of a multi-channel source signal including a number of source signal components and the second signal component being a corresponding residual signal; the arrangement comprising:

a prediction filter for estimating the second signal component, the prediction filter corresponding to a set of filter parameters and receiving the first signal component as an input, wherein the prediction filter is controlled by an error signal indicative of a difference of the second signal component and an estimate of the second signal component; and a processor configured for representing the multi-channel signal as the first signal component and the set of filter parameters including representing the multi-channel signal as the principal component signal, the set of filter parameters, and the at least one transformation parameter;

the processor being further configured for transforming at least the first and second source signal components by a predetermined transformation into the principal component signal including most of the signal energy and at least the residual signal including less energy than the principal component signal, the predetermined transformation being parameterized by at least one transformation parameter.

12. An arrangement for decoding a multi-channel signal corresponding to at least two signal components, the arrangement comprising:

receiving means for receiving a first signal component of the multi-channel signal, a set of filter parameters of an adaptive filter controlled by an error signal indicative of a difference of a second signal component and an estimate of the second signal component, and at least one transformation parameter, the first signal component corresponding to a result of a predetermined transformation of at least a first source signal component and a second source signal component of a source multi-channel signal, the predetermined transformation being parameterized by the at least one transformation parameter;

a prediction filter for estimating the second signal component of the multichannel signal, the prediction filter receiving the received set of filter parameters of the adaptive filter and the received first signal component as an input; and a decoder configured to generate a first decoded signal component and a second decoded signal component by inversely transforming the first signal component and the estimated second signal component.

13. A data signal including multi-channel signal information, the data signal being generated by a method of encoding a multi-channel signal including at least a first signal component and a second signal component, the first signal component being a principal component signal of a multi-channel source signal including a number of source signal components and the second signal component being a corresponding residual signal; the method comprising the acts of:

determining a set of filter parameters of a prediction filter such that the prediction filter provides an estimate of the second signal component when receiving the first signal component as an input;

controlling the prediction filter by an error signal indicative of a difference of the second signal component and the estimate of the second signal component;

representing the multi-channel signal as the first signal component and the set of filter parameters; and transforming at least first and second source signal components of the multi-channel source signal by a predetermined transformation into the principal component signal including most of the signal energy and at least the residual signal including less energy than the principal component signal, the predetermined transformation being parameterized by at least one transformation parameter;

wherein the act of representing the multi-channel signal as the first signal component and the set of filter parameters further comprises the act of representing the multi-channel signal as the principal component signal, the set of filter parameters, and the at least one transformation parameter.

14. A computer-readable medium comprising a data record indicative of multi-channel signal information generated by a method of encoding a multi-channel signal including at least a first signal component and a second signal component, the first signal component being a principal component signal of a multi-channel source signal including a number of source signal components and the second signal component being a corresponding residual signal; the method comprising the acts of:

determining a set of filter parameters of a prediction filter such that the prediction filter provides an estimate of the second signal component when receiving the first signal component as an input;

controlling the prediction filter by an error signal indicative of a difference of the second signal component and the estimate of the second signal component;

representing the multi-channel signal as the first signal component and the set of filter parameters; and transforming at least first and second source signal components of the multi-channel source signal by a predetermined transformation into the principal component signal including most of the signal energy and at least the residual signal including less energy than the principal component signal, the predetermined transformation being parameterized by at least one transformation parameter;

wherein the act of representing the multi-channel signal as the first signal component and the set of filter parameters further comprises the act of representing the multi-channel signal as the principal component signal, the set of filter parameters, and the at least one transformation parameter.

15. A device for communicating a multi-channel signal, the device comprising an arrangement for encoding a multi-channel signal including at least a first signal component and a second signal component, the first signal component being a principal component signal of a multi-channel source signal including a number of source signal components and the second signal component being a corresponding residual signal; the arrangement comprising:

a prediction filter for estimating the second signal component, the prediction filter corresponding to a set of filter parameters and receiving the first signal component as an input, wherein the prediction filter is controlled by an error signal indicative of a difference of the second signal component and an estimate of the second signal component; and a processor configured for representing the multichannel signal as the first signal component and the set of filter parameters including representing the multi-channel signal as the principal component signal, the set of filter parameters, and the at least one transformation parameter;

the processor being further configured for transforming at least the first and second source signal components by a predetermined transformation into the principal component signal including most of the signal energy and at least the residual signal including less energy than the principal component signal, the predetermined transformation being parameterized by at least one transformation parameter.

* * * * *